United States Patent
Stern et al.

(10) Patent No.: US 9,497,427 B2
(45) Date of Patent: Nov. 15, 2016

(54) METHOD AND APPARATUS FOR IMAGE FLARE MITIGATION

(71) Applicant: Semiconductor Components Industries, LLC, Phoenix, AZ (US)

(72) Inventors: Jonathan Michael Stern, San Carlos, CA (US); Robert A. Black, Milpitas, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 13/942,201

(22) Filed: Jul. 15, 2013

(65) Prior Publication Data

US 2015/0015750 A1 Jan. 15, 2015

(51) Int. Cl.
*H04N 5/238* (2006.01)
*H04N 9/04* (2006.01)
*H04N 1/58* (2006.01)
*H04N 5/217* (2011.01)
*H04N 5/232* (2006.01)

(52) U.S. Cl.
CPC ............. *H04N 9/045* (2013.01); *H04N 1/58* (2013.01); *H04N 5/217* (2013.01); *H04N 5/23229* (2013.01)

(58) Field of Classification Search
USPC ........................................................ 358/3.26
See application file for complete search history.

(56) References Cited

U.S. PATENT DOCUMENTS

| | | | |
|---|---|---|---|
| 4,974,810 A | 12/1990 | Fiske | |
| 2005/0093992 A1* | 5/2005 | Fukumoto | G06T 7/408 348/222.1 |
| 2009/0238462 A1* | 9/2009 | Feris et al. | 382/190 |
| 2010/0177205 A1* | 7/2010 | Shimoda et al. | 348/222.1 |
| 2013/0002902 A1 | 1/2013 | Ito | |
| 2014/0192227 A1* | 7/2014 | Zhang | H04N 9/045 348/230.1 |

\* cited by examiner

*Primary Examiner* — Qian Yang
(74) *Attorney, Agent, or Firm* — Treyz Law Group, P.C.; Michael H. Lyons; Vineet Dixit

(57) ABSTRACT

An imaging system may include a camera module with an image sensor having an array of image sensor pixels and one or more lenses that focus light onto the array of image sensor pixels. The array of image sensor pixels may include a corresponding array of color filter elements. The system may include circuitry configured to detect and mitigate flare artifacts in image data captured using the image sensor. Detecting the flare artifacts may include detecting color mismatches in the captured image data and performing edge-detection operations to determine whether the color mismatches are in an edge region of the image data. If the color mismatches are detected in an edge region, no flare-mitigation operations may be performed. If the color mismatches are in a flat region of the captured image, flare-mitigation operations may be performed.

18 Claims, 6 Drawing Sheets

METHOD AND APPARATUS FOR IMAGE FLARE MITIGATION

BACKGROUND

This relates generally to imaging systems, and more particularly, to imaging systems with flare mitigation capabilities.

Image sensors are commonly used in electronic devices such as cellular telephones, cameras, and computers to capture images. In a typical arrangement, an electronic device is provided with an array of image pixels and one or more lenses that focus image light onto the array of image pixels. Circuitry is commonly coupled to each pixel column for reading out image signals from the image pixels.

Light from objects in the field-of-view of an imaging system is typically focused onto the array of image pixels during image capture operations. In some situations, light from a light source that is inside or outside the field-of-view can enter the imaging system at a large angle of incidence or may travel along another path that results in multiple reflections within the optical system. This type of unwanted light can be reflected from one or more surfaces at which there are changes in refractive index in the imaging system before being absorbed by image pixels in the array, thereby generating flare artifacts in captured images.

Hardware such as baffles and light-absorbing coatings for preventing flare artifacts can be expensive to implement and/or impractical in many implementations.

It would therefore be desirable to be able to provide imaging systems with improved flare mitigation capabilities.

DETAILED DESCRIPTION

Electronic devices such as digital cameras, computers, cellular telephones, and other electronic devices include image sensors that gather incoming light to capture an image. The image sensors may include arrays of image pixels. The pixels in the image sensors may include photosensitive elements such as photodiodes that convert the incoming light into image signals. Image sensors may have any number of pixels (e.g., hundreds, thousands, millions or more). A typical image sensor may, for example, have hundreds of thousands or millions of pixels (e.g., megapixels). Image sensors may include control circuitry such as circuitry for operating the image pixels, readout circuitry for reading out image signals corresponding to the electric charge generated by the photosensitive elements, and, if desired, other processing circuitry such as analog processing circuitry and digital processing circuitry. An image sensor may be coupled to additional processing circuitry such as circuitry on a companion chip to the image sensor, circuitry in the device that is coupled to the image sensor by one or more cables or other conductive lines, or external processing circuitry.

Figure 1:
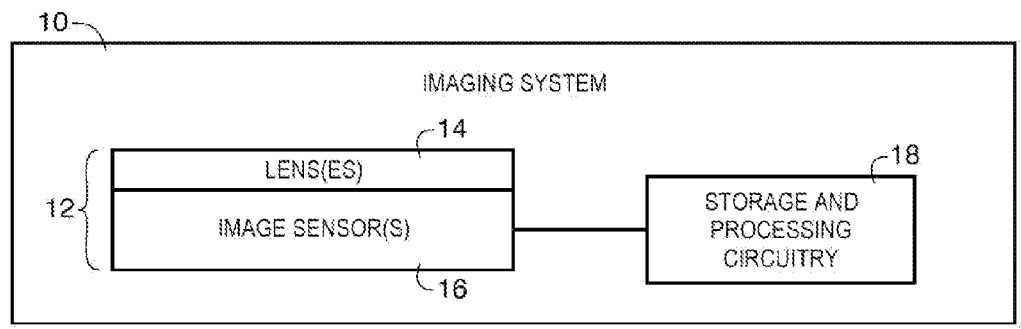
FIG. 1 is a diagram of an illustrative imaging system in accordance with an embodiment of the present invention.

FIG. 1 is a diagram of an illustrative electronic device that uses an image sensor to capture images. Electronic device 10 of FIG. 1 may be a portable electronic device such as a camera, a cellular telephone, a video camera, or other imaging device that captures digital image data. Camera module 12 may be used to convert incoming light into digital image data. Camera module 12 may include one or more lenses 14 and one or more corresponding image sensors 16. During image capture operations, light from a scene may be focused onto image sensor 16 by lens 14. Image sensor 16 may include circuitry for converting analog pixel data into corresponding digital image data to be provided to processing circuitry 18. If desired, camera module 12 may be provided with an array of lenses 14 and an array of corresponding image sensors 16.

Processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be processed and stored using processing circuitry 18. Processed image data may, if desired, be provided to external equipment (e.g., a computer or other device) using wired and/or wireless communications paths coupled to processing circuitry 18.

Figure 2:
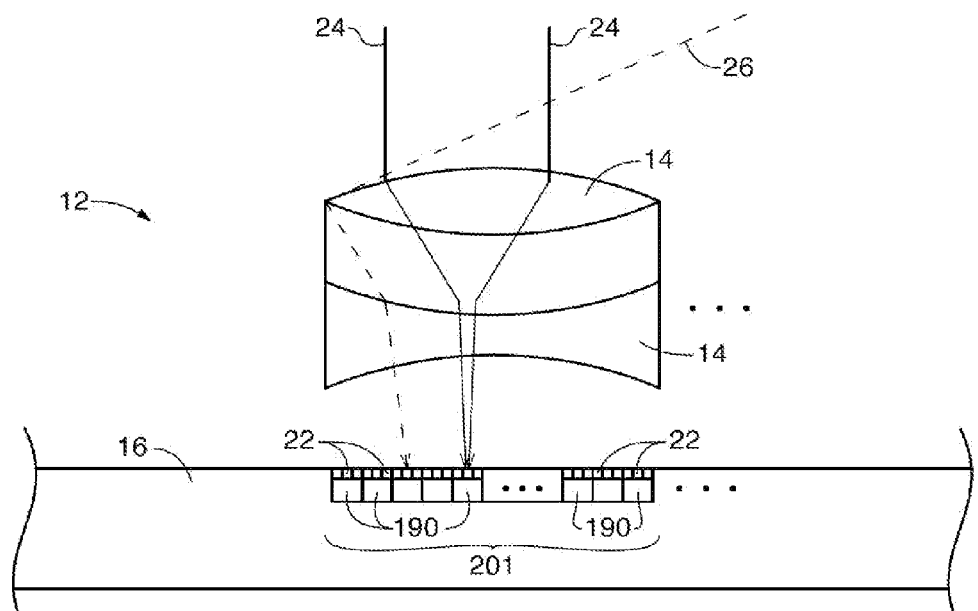
FIG. 2 is cross-sectional side view of an illustrative camera module showing how image light and stray light may pass through one or more lenses onto an image pixel array in accordance with an embodiment of the present invention.

As shown in FIG. 2, image sensor 16 may include one or more arrays of image pixels such as pixel array 201 containing image sensor pixels 190 (sometimes referred to herein as image pixels 190). Array 201 may contain, for example, hundreds or thousands of rows and columns of image sensor pixels 190.

Image sensor pixels 190 may be covered by a color filter array that includes color filter elements 22 over some or all image pixels 190. Color filter elements 22 may be red color filter elements (e.g., photoresistive material that passes red light while reflecting and/or absorbing other colors of light), blue color filter elements (e.g., photoresistive material that passes blue light while reflecting and/or absorbing other colors of light), green color filter elements (e.g., photoresistive material that passes green light while reflecting and/or absorbing other colors of light), clear color filter elements (e.g., transparent material that passes red, blue and green light) or other color filter elements. If desired, some or all of image pixels 190 may be provided without any color filter elements. Image pixels that are free of color filter material and image pixels that are provided with clear color filters may be referred to herein as clear pixels, white pixels, clear image pixels, or white image pixels.

As shown in FIG. 2, one or more lenses 14 (e.g., convex lenses, concave lenses, or other lenses) may focus light such as image light 24 onto image pixels 190. Image light 24 originates within the field-of-view of camera module 12. Image light 24 follows a predictable path through lenses 14 onto image sensor 16.

In some situations, light that originates outside the field-of-view of camera module 12 such as stray light 26 may find a path through some or all of lenses 14 and onto image sensor 16. In other situations, light that originates within the field-of-view of camera module 12 can also generate stray light 26 (e.g., light may encounter one or more changes in refractive index within camera module 12 such as interfaces between air and plastic or glass that cause some light to be reflected back from the interface and eventually onto the image sensor via multiple reflection paths). In the example of FIG. 2, stray light 26 reflects from an edge of upper lens 14 and reflects through lower lens 14 onto image pixels 190. However, this is merely illustrative. Stray light from, for example, a bright light source such as the sun, the moon, a street light, a light bulb, etc. may take various paths onto image sensor 16. In this way, image artifacts such as flare artifacts or ghost artifacts may be generated in captured images by image pixels that are affected by the stray light.

Processing circuitry such as processing circuitry 18 may be configured to detect color or brightness differences related to this type of flare artifact in image data from image pixels 190 and, if desired, to perform flare-mitigation operations on the image data.

Figure 3:
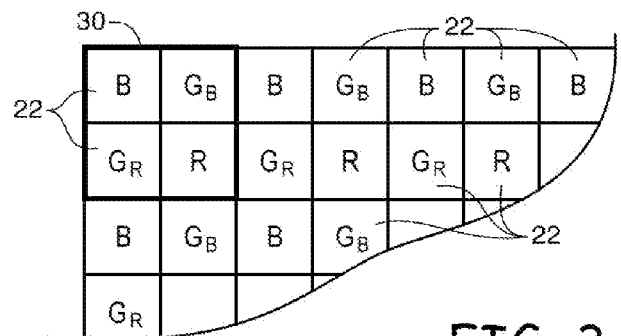
FIG. 3 is a diagram of an illustrative image pixel array showing how the pixel array may be provided with a Bayer pattern color filter array with unit pixel cells having a red color filter, a blue color filter and two green color filters in accordance with embodiments of the present invention.
Figure 4:
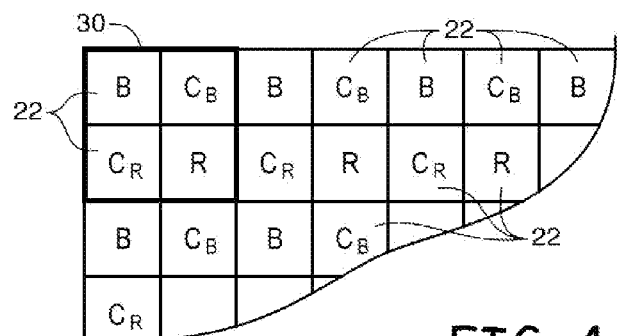
FIG. 4 is a diagram of an illustrative image pixel array showing how the pixel array may be provided unit pixel cells having a red color filter, a blue color filter and two clear color filters in accordance with embodiments of the present invention.
Figure 5:
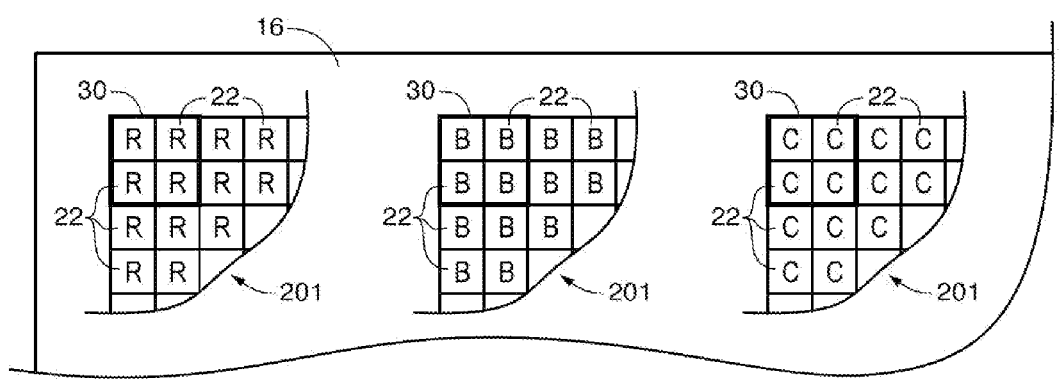
FIG. 5 is a diagram of an illustrative image sensor having multiple arrays of image pixels showing how each array may be provided with color filter elements of a single color in accordance with an embodiment of the present invention.

FIGS. 3, 4, and 5 show examples of color filter patterns that may be formed by color filter elements 22.

As shown in FIG. 3, color filter elements 22 may be formed in a Bayer mosaic pattern consisting of repeating unit cells 30 of two-by-two image pixels 190, each with two green color filter elements (e.g., a green ($G_B$) color filter element formed in a common row with blue color filter elements and a green ($G_R$) color filter element formed in a common row with red color filter elements) diagonally opposite one another and adjacent to a red (R) color filter elements diagonally opposite to a blue (B) color filter element 22. However, this is merely illustrative. If desired, other color filter patterns may be used.

In the example of FIG. 4, unit cell 30 of image pixels 190 is formed from two clear image pixels (e.g., pixels $C_R$ and $C_B$ with clear color filter elements 22 or without any color filter elements) that are diagonally opposite one another and adjacent to a red (R) image pixel that is diagonally opposite to a blue (B) image pixel. Clear pixels $C_B$ are formed in a common row with blue (B) pixels and clear pixels $C_R$ are formed in a common row with red (R) pixels.

Clear pixels (e.g., pixels $C_R$ and $C_B$) may be formed with a visibly transparent color filter that transmits light across the visible light spectrum (e.g., clear pixels 190 can capture white light). Clear image pixels 190 may have a natural sensitivity defined by the material that forms the transparent color filter and/or the material that forms the image sensor pixel (e.g., silicon). The sensitivity of clear image pixels 190 may, if desired, be adjusted for better color reproduction and/or noise characteristics through use of light absorbers such as pigments. Unit cell 30 may be repeated across image pixel array 201 to form a mosaic of red, clear, and blue image pixels 190. In this way, red image pixels may generate red image signals in response to red light, blue image pixels may generate blue image signals in response to blue light, and clear image pixels may generate white image signals in response to white light.

Unit cells 30 of FIGS. 3 and 4 are merely illustrative. If desired, unit cells 30 may include any suitable combination of two, three, four, or more than four image pixels. In the example of FIG. 5, image sensor 16 includes multiple pixel arrays 201 each having image pixels 190 with color filter elements 22 having a common color. In this example, image sensor 16 includes a red color filter array, a blue color filter array, and a green color filter array. However, this is merely illustrative. If desired, image sensor 16 may include any number of pixel arrays, each having any suitable number of image sensor pixels with any combination of color filter elements.

Because of differences in pixel architecture for neighboring pixels 190 in a pixel cell 30, differences in color filter elements 22 for neighboring pixels 190, and/or potentially large angles at which stray light 26 may be incident on image pixels 190, flare artifacts of the type described above in connection with FIG. 2 may have a particular color.

For example, stray light that passes through a portion of a red color filter before passing though a portion of a green color filter and onto a photosensor of a green pixel may be brighter (or fainter) than stray light that passes through a portion of a blue color filter before passing though a portion of a green color filter and onto the photosensor of a nearby green pixel. For this reason, an image signal from a green pixel that is adjacent to a red pixel may be brighter (or fainter) than an image signal from a green pixel that is adjacent to a blue pixel. In one particular example, which is sometimes described herein, this type of brightness difference gives rise to flare artifacts having a purple color in an image sensor having a color filter array with unit pixel cells 30 having a red color filter, a green color filter, and two clear color filters as in the example of FIG. 4.

Processing circuitry such as processing circuitry 18 may be configured to detect this type of difference in brightness and use the detected difference to determine that that image data is affected by stray light. For example, circuitry 18 may determine that the signal from a $C_R$ pixel from a given pixel cell is substantially different than the signal from a $C_B$ pixel in the same pixel cell even though no object edges affect those image signals. The processing circuitry may then take suitable action for flare mitigation. As examples of flare-mitigation operations, the processing circuitry may generate metadata such a flare flag to be transmitted with the affected image data or the processing circuitry may change the image data to reduce or eliminate the effect of the stray light (e.g., by changing the color of the flare to a flat grey or white color, by applying a flare-specific color correction matrix, or by performing other flare-mitigation operations).

The example described above in which the relative brightness of nearby clear pixels is different due to the color of adjacent color filters is merely illustrative. Relative differences in brightness (sometimes referred to herein as pixel value mismatches or color mismatches) for nearby pixels may be generated in other color filter arrays and/or by the pixel architecture itself, even if all pixels have a common color as in the example of FIG. 5. For example, light received at a large angle may generate relatively larger image signals in image pixels at some locations in a unit cell with respect to image pixels in other locations in the unit pixel cell. Because the pattern of unit cells is a repeating pattern, repeating pixel mismatches in flare-affected regions may be detected. In configurations of the type shown in FIG. 5, flare-mitigation operations may include replacing pixel values for one array of image pixels that is particularly affected by stray light with modified pixel values from another array of image pixels that is relatively less affected by the stray light. The modified pixel values may be color-adjusted pixel values from image pixels of a different color.

Figure 6:
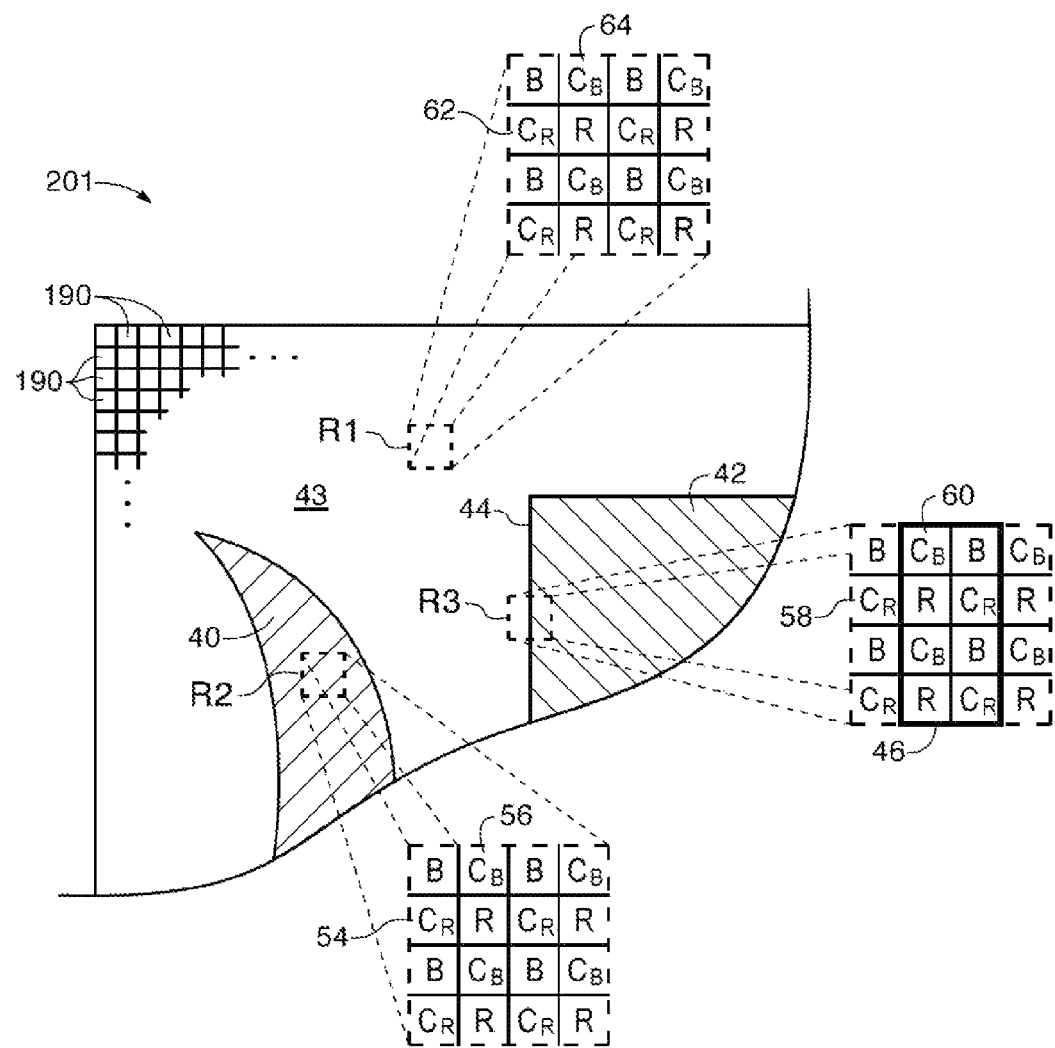
FIG. 6 is a diagram of illustrative image data having a flare artifact and an object with an edge in accordance with an embodiment of the present invention.

Differences in brightness in nearby pixels with any configuration of color filter elements may also arise due to real edges of real objects seen in image light 24. As shown in FIG. 6, an image may be formed on pixel array 201 of image sensor 16. The image may be formed from image light such as light 24 (see FIG. 2) and, in some situations, stray light such as stray light 26.

The image data generated by image pixels 190 may therefore include flare artifacts such as flare artifact 40, background image data such as background image 43, and object images such as object image 42. Object image 42 may have an edge such as edge 44. A particular region of the image may therefore be a background region such as background region R1, a flare region such as flare region R2, an edge region such as edge region R3 or other region (e.g., a region of object image 42 that is not an edge).

In flare region R2, image signals from particular image pixels such as clear pixels 54 and 56 may have very different values (e.g., the $C_R$ image pixel signal from pixel 54 may be much greater than the $C_B$ image signal value from pixel 56) that indicate the presence of flare artifact 40. However, as shown in FIG. 6, edge 44 of object 42 may create an edge discontinuity 46 that causes image signals from particular image pixels such as clear pixels 58 and 60 in region R3 to also have very different values even though no flare is present. In background regions such as region R1 (or other regions), image pixel signals from nearby pixels of a common color such as clear pixels 62 and 64 may have substantially similar values.

Processing circuitry such as processing circuitry 18 may therefore perform additional image processing operations such as edge-detection operations to avoid performing flare-mitigation operations on images of objects having real color or brightness differences.

Figure 7:
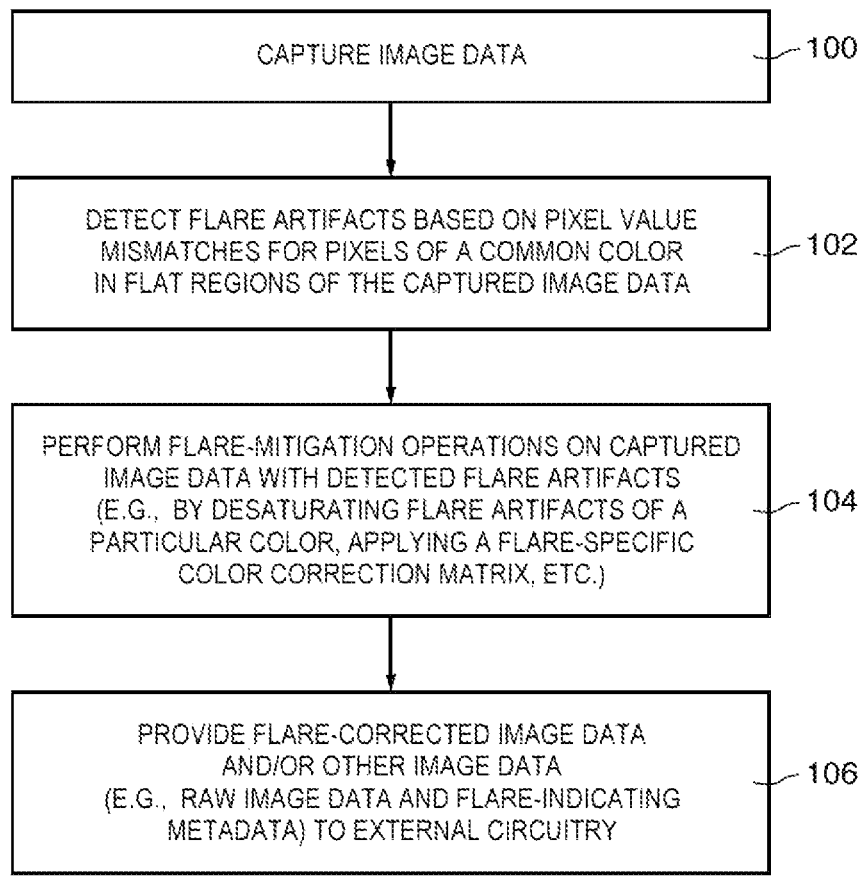
FIG. 7 is a flow chart of illustrative steps that may be involved in flare detection and mitigation operations for an imaging system in accordance with an embodiment of the present invention.

Illustrative steps that may be performed during flare detection and mitigation operations are shown in FIG. 7.

At step 100, a camera module such as camera module 12 of FIGS. 1 and 2 may be used to capture image data. The captured image data may include image data from image pixels having red color filter elements, blue color filter elements, green color filter elements, clear color filter elements, other color filter elements, or image pixels that are free of color filter material.

At step 102, circuitry such as circuitry on image sensor 16 or processing circuitry 18 may be used to detect flare artifacts in the captured image data based on pixel value mismatches (color mismatches) for pixels of a common color in flat (non-edge) regions of the captured image data. Detecting the flare artifacts may include detecting the color mismatches by comparing an image signal from a first image pixel (e.g., a first clear image pixel or a first green image pixel) in a unit pixel cell with an additional image signal from a second image pixel (e.g., a second clear image pixel or a second green image pixel) in that unit pixel cell.

At step 104, circuitry such as processing circuitry 18 may be used to perform flare-mitigation operations on the captured image data with the detected flare artifacts. Performing flare-mitigation operations may include desaturating flare artifacts of a particular color (e.g., purple flare), applying a flare-specific color correction matrix to flare artifacts, or other suitable operations for reducing or eliminating the flare artifacts.

At step 106, flare-corrected image data and/or other image data such as raw image data and flare-indicating metadata may be provided to external circuitry. Flare-indicating metadata may include one or more flags that indicate the presence and/or severity of flare artifacts in image data from certain image pixels. Additional software or hardware such as post-processing software may use the flare-corrected image data, the raw image data, and/or the flare-indicating metadata to generate flare-corrected images.

Figure 8:
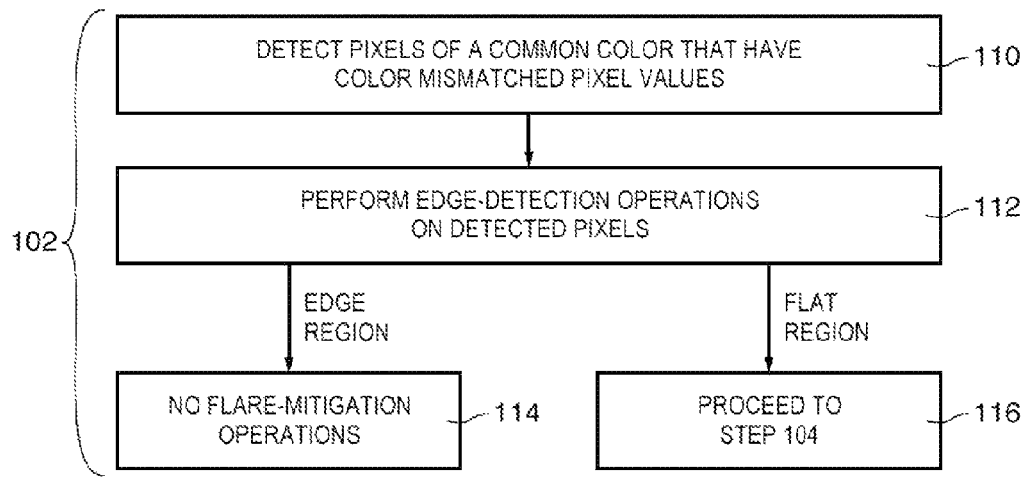
FIG. 8 is a flow chart of illustrative steps that may be included in the flare detection operations of step 102 of FIG. 7 in which color mismatch detection operations are performed prior to edge-detection operations in accordance with an embodiment of the present invention.
Figure 9:
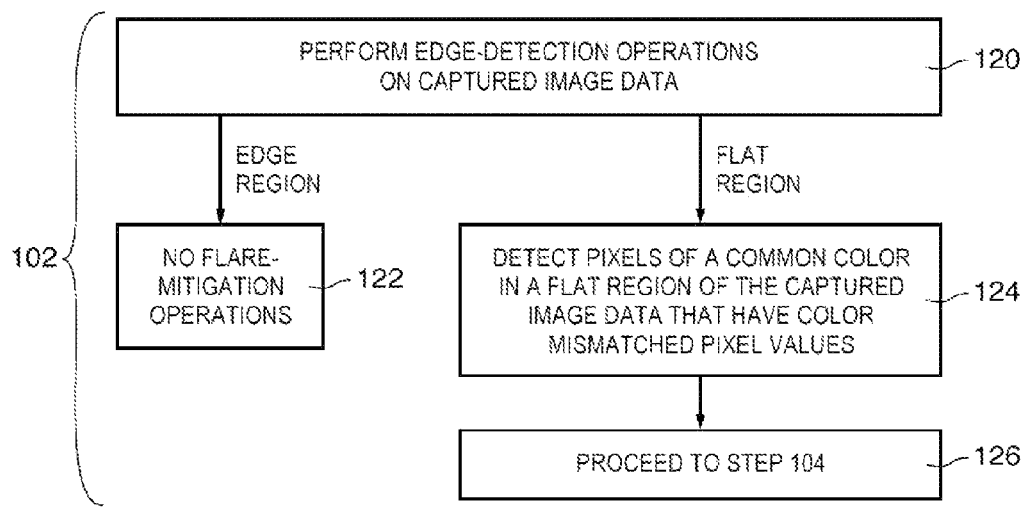
FIG. 9 is a flow chart of illustrative steps that may be included in the flare detection operations of step 102 of FIG. 7 in which edge-detection operations are performed prior to color mismatch detection operations in accordance with an embodiment of the present invention.

FIGS. 8 and 9 show illustrative steps that may be used in performing the flare-detection operations of step 102 of FIG. 7. In the example of FIG. 7, color mismatches are detected in image data prior to performing edge-detection operations. In the example of FIG. 8, edge-detection operations are performed prior to detection of color mismatches.

As shown in FIG. 8, at step 110, pixel values (e.g., pixel values from pixels of a common color such as clear pixels in a unit cell) having color mismatched pixel values may be detected. Detecting the color mismatched pixel values may include computing ratios or differences of pixel values from pixels of a common color in various unit cells and comparing the computed ratios or differences with a predetermined threshold.

At step 112, edge-detection operations may be performed on the detected pixels with color mismatches to determine whether the color mismatched pixels are in an edge region.

In response to determining that the color mismatched pixels are in an edge region, system 10 may proceed to step 114.

At step 114, system 10 may determine that no flare-mitigation operations should be performed.

In response to determining that the color mismatched pixels are in a flat (non-edge) region, system 10 may proceed to step 116.

At step 116, system 10 may determine that flare-mitigation operations should be preformed and proceed to step 104 of FIG. 7.

As shown in FIG. 9, at step 120, edge-detection operations may be performed on substantially all of the captured image data. Performing the edge-detection operations of step 120 may include generating an edge map that stores the locations of object edges in the captured image data.

At step 122, system 10 may determine that no flare-mitigation operations are to be performed in edge regions of the captured image data.

At step 124, pixel values in flat (non-edge) regions of the captured image data (e.g., pixel values from pixels of a common color in the flat region such as clear pixels in a unit cell in the flat region) having color mismatched pixel values may be detected. Detecting the color mismatched pixel values in the flat region may include computing ratios or differences of pixel values from pixels of a common color in various unit cells in the flat region and comparing the computed ratios or differences with a predetermined threshold.

At step 126, system 10 may determine that flare-mitigation operations for the detected pixels in the flat region should be preformed and proceed to step 104 of FIG. 7.

Figure 10:
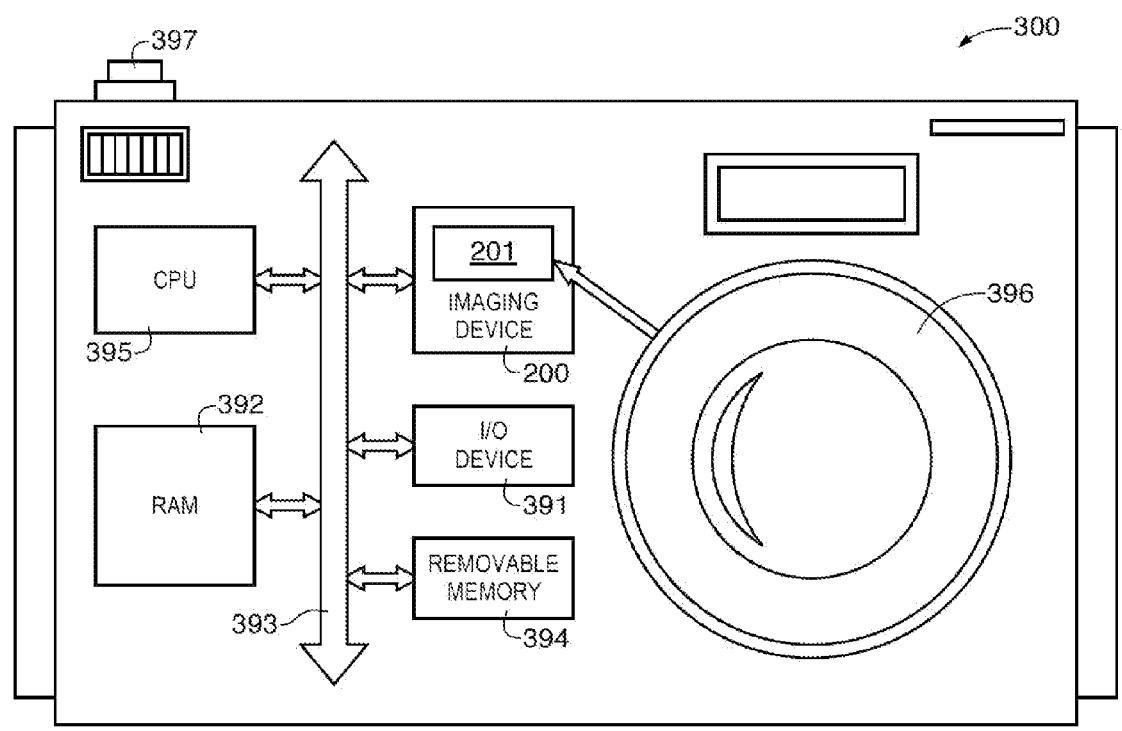
FIG. 10 is a block diagram of a processor system employing the embodiments of FIGS. 1-9 in accordance with an embodiment of the present invention.

FIG. 10 shows in simplified form a typical processor system 300, such as a digital camera, which includes an imaging device 200. Imaging device 200 may include a pixel array 201 of the type shown in FIG. 2 and circuitry for performing flare detection and mitigation operations. Processor system 300 is exemplary of a system having digital circuits that may include imaging device 200. Without being limiting, such a system may include a computer system, still or video camera system, scanner, machine vision, vehicle navigation, video phone, surveillance system, auto focus system, star tracker system, motion detection system, image stabilization system, and other systems employing an imaging device.

Processor system 300, which may be a digital still or video camera system, may include a lens such as lens 396 for focusing an image onto a pixel array such as pixel array 201 when shutter release button 397 is pressed. Processor system 300 may include a central processing unit such as central processing unit (CPU) 395. CPU 395 may be a microprocessor that controls camera functions and one or more image flow functions and communicates with one or more input/output (I/O) devices 391 over a bus such as bus 393. Imaging device 200 may also communicate with CPU 395 over bus 393. System 300 may include random access memory (RAM) 392 and removable memory 394. Removable memory 394 may include flash memory that communicates with CPU 395 over bus 393. Imaging device 200 may be combined with CPU 395, with or without memory storage, on a single integrated circuit or on a different chip. Although bus 393 is illustrated as a single bus, it may be one or more buses or bridges or other communication paths used to interconnect the system components.

Various embodiments have been described illustrating imaging systems with flare detection and mitigation capabilities.

A system may include a camera module with an array of image sensor pixels and one or more lenses that focus light onto the array of image sensor pixels. The array of image sensor pixels may include a corresponding array of color filter elements. Stray light that enters the camera module may generate flare artifacts in captured images.

The system may include circuitry configured to detect color mismatches in the captured images and to detect flare artifacts based on the detected color mismatches. The system may also perform edge-detection operations to determine whether the color mismatches are in an edge region of the image. If the color mismatches are detected in an edge region, no flare-mitigation operations may be performed. If the color mismatches are in a flat region of the captured image, flare-mitigation operations may be performed.

Flare-mitigation operations may include generating flare-indicating metadata such as flare flag bits and/or performing corrective action on the captured images (e.g., by desaturating the flare artifacts and/or replacing or modifying flare-affected image data).

The foregoing is merely illustrative of the principles of this invention which can be practiced in other embodiments.

What is claimed is:

1. An imaging system, comprising:
    an image sensor comprising a plurality of image pixels, wherein the plurality of image pixels are configured to capture image data;
    at least one lens that focuses image light onto the image sensor; and
    processing circuitry configured to detect and mitigate flare artifacts in a frame of the captured image data by detecting color mismatches in portions of the frame of the captured image data captured by at least first and second image pixels of the plurality of image pixels, wherein the processing circuitry detects color mismatches in the portions of the frame of the captured image data that is output from the first and second image pixels by comparing a ratio between a first portion of the frame of the captured image data captured by the first image pixel and a second portion of the frame of the captured image data captured by the second image pixel to a predetermined threshold.

2. The imaging system defined in claim 1 wherein the processing circuitry is further configured to detect the flare artifacts by performing edge-detection operations on the frame of the captured image data.

3. The imaging system defined in claim 2 wherein image sensor comprises an array of image pixels and a corresponding array of color filter elements.

4. The imaging system defined in claim 3 wherein the corresponding array of color filter elements comprises repeating groups of red color filter elements, blue color filter elements, and green color filter elements.

5. The imaging system defined in claim 3 wherein the corresponding array of color filter elements comprises repeating groups of red color filter elements, blue color filter elements, and clear color filter elements.

6. The imaging system defined in claim 2 wherein image sensor comprises a plurality of arrays of image pixels and wherein each array of image pixels has a corresponding array of color filter elements having a common color.

7. The imaging system defined in claim 1, wherein the first image pixel is adjacent to the second image pixel.

8. A method of generating images, comprising:
    with an image sensor comprising a plurality of image pixels, capturing an image having image data;
    with processing circuitry, detecting color mismatches in portions of the captured image data that is output from at least first and second clear image pixels of the plurality of image pixels; and
    with the processing circuitry, detecting flare artifacts in at least some of the portions of the captured image data based on the detected color mismatches by comparing a difference between an image signal from the first clear image pixel and an additional image signal from the second clear image pixel to a predetermined threshold.

9. The method defined in claim 8, further comprising:
    with the processing circuitry, performing edge-detection operations on the captured image data.

10. The method defined in claim 9 wherein performing the edge-detection operations on the captured image data comprises performing the edge-detection operations on the captured image data prior to detecting the color mismatches in the portions of the captured image data.

11. The method defined in claim 9 wherein performing the edge-detection operations on the captured image data comprises performing the edge-detection operations on the captured image data after detecting the color mismatches in the portions of the captured image data.

12. The method defined in claim 9, further comprising:
with the processing circuitry, performing flare-mitigation operations on the at least some of the portions of the captured image data.

13. The method defined in claim 12 wherein performing the flare-mitigation operations on the at least some of the portions of the captured image data comprises generating flare-indicating metadata.

14. The method defined in claim 12 wherein performing the flare-mitigation operations on the at least some of the portions of the captured image data comprises desaturating the at least some of the portions of the captured image data.

15. The method defined in claim 12 wherein performing the flare-mitigation operations on the at least some of the portions of the captured image data comprises modifying the at least some of the portions of the captured image data using a flare-specific color correction matrix.

16. The method defined in claim 8, further comprising:
computing a ratio of the image signal and the additional image signal; and
comparing the computed ratio to an additional threshold.

17. A system, comprising:
a central processing unit;
memory;
input-output circuitry; and
an imaging device, wherein the imaging device comprises:
an image sensor having an array of image sensor pixels arranged in repeating unit cells each having a red pixel, a blue pixel, and two clear pixels;
at least one lens that focuses image light onto the image sensor; and
processing circuitry configured to detect flare artifacts in an image having image data captured using the image sensor by detecting color mismatches in a portion of the captured image data of the image captured by at least first and second image sensor pixels, wherein the processing circuitry is further configured to detect edges of objects that are being imaged in the portion of the captured image data, wherein the processing circuitry is further configured to perform flare mitigation operations when no object edges are detected in the portion of the captured image data, and wherein the processing circuitry is further configured to omit flare-mitigation operations on the captured image data when object edges are detected in the portion of the captured image data.

18. The system defined in claim 17 wherein the processing circuitry is further configured to perform flare-mitigation operations on the detected flare artifacts in response to determining that the portion of the captured image data is flat.

* * * * *